(12) United States Patent
Winter et al.

(10) Patent No.: US 7,627,791 B2
(45) Date of Patent: Dec. 1, 2009

(54) METHOD AND APPARATUS FOR RECORDING A DATA STREAM ON A STORAGE MEDIUM

(75) Inventors: Marco Winter, Böhmerstr (DE);
Wolfgang Klausberger, Hannover (DE);
Stefan Kubsch, Hohnhorst (DE);
Hartmut Peters, Barsinghausen (DE);
Uwe Janssen, Seelze (DE)

(73) Assignee: Thomson Licensing, Boulogne-Billancourt (FR)

( * ) Notice: Subject to any disclaimer, the term of this patent is extended or adjusted under 35 U.S.C. 154(b) by 510 days.

(21) Appl. No.: 10/528,596

(22) PCT Filed: Sep. 15, 2003

(86) PCT No.: PCT/EP03/10235

§ 371 (c)(1),
(2), (4) Date: Mar. 21, 2005

(87) PCT Pub. No.: WO2004/029963

PCT Pub. Date: Apr. 8, 2004

(65) Prior Publication Data

US 2006/0062122 A1    Mar. 23, 2006

(30) Foreign Application Priority Data

Sep. 27, 2002    (EP)    .................................. 02021640

(51) Int. Cl.
*G11C 29/00*    (2006.01)
(52) U.S. Cl. ........................... 714/710; 714/8; 714/781; 714/805; 714/2; 714/6; 714/747; 369/53.35; 369/44.27; 369/53.17; 369/275.3; 369/53.1

(58) Field of Classification Search ...................... None
See application file for complete search history.

(56) References Cited

U.S. PATENT DOCUMENTS

| | | | |
|---|---|---|---|
| 4,949,326 A | | 8/1990 | Takagi et al. |
| 5,233,584 A | * | 8/1993 | Kulakowski et al. ...... 369/44.27 |
| 5,666,335 A | | 9/1997 | Horibe |
| 5,719,717 A | * | 2/1998 | Leonhardt et al. ............. 360/48 |
| 5,844,911 A | * | 12/1998 | Schadegg et al. ........... 714/710 |
| 5,896,364 A | * | 4/1999 | Okazaki et al. .......... 369/275.3 |
| 6,043,945 A | * | 3/2000 | Tsuboi et al. .................. 360/53 |

(Continued)

FOREIGN PATENT DOCUMENTS

EP    1679710 A1    7/2006

(Continued)

OTHER PUBLICATIONS

Search Report Dated May 7, 2004.

*Primary Examiner*—John P Trimmings
(74) *Attorney, Agent, or Firm*—Robert D. Shedd; Robert B. Levy; Jorge Tony Villabon

(57) ABSTRACT

The resistance against recording defects of a write-once optical disk is enhanced allowing realtime recording and playback of data streams with a single speed disk drive. A data stream is recorded in data blocks on the optical disk. An error correction block for one or more data blocks is generated and written on the same optical disk during recording. A spare data area is kept blank on the storage medium and used for storing a defect data block reconstructed by using the error correction block.

4 Claims, 10 Drawing Sheets

U.S. PATENT DOCUMENTS

Figure 1:
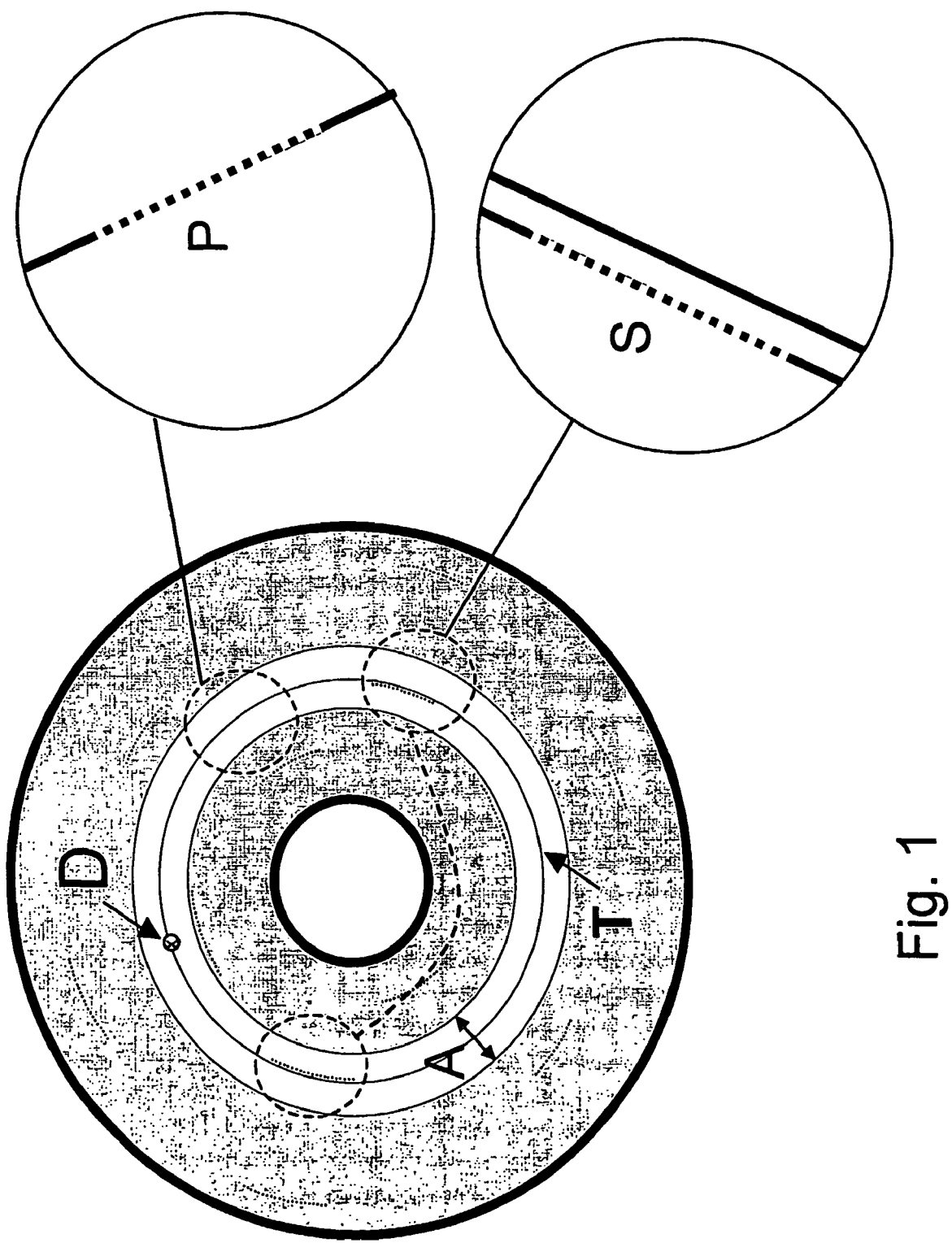

| | | | |
|---|---|---|---|
| 6,189,110 B1 * | 2/2001 | Saitoh et al. | 714/8 |
| 6,205,099 B1 * | 3/2001 | Sasaki et al. | 369/53.17 |
| 6,338,153 B1 * | 1/2002 | Sasaki et al. | 714/710 |
| 6,385,736 B1 * | 5/2002 | Jeong et al. | 714/8 |
| 6,463,024 B1 * | 10/2002 | Park | 369/53.35 |
| 6,477,682 B2 * | 11/2002 | Cypher | 714/805 |
| 6,564,345 B1 | 5/2003 | Kim et al. | |
| 6,674,697 B1 * | 1/2004 | Ko | 369/47.14 |
| 6,735,258 B1 * | 5/2004 | Trott et al. | 375/308 |
| 6,742,147 B1 * | 5/2004 | Sasaki et al. | 714/710 |
| 6,754,860 B2 | 6/2004 | Kim et al. | |
| 6,775,803 B1 * | 8/2004 | Chung et al. | 714/763 |
| 7,203,896 B2 * | 4/2007 | Murillo et al. | 714/781 |
| 7,221,631 B2 * | 5/2007 | Park et al. | 369/53.12 |
| 7,251,760 B2 * | 7/2007 | Kim et al. | 714/723 |
| 2001/0020261 A1 | 9/2001 | Ando et al. | |
| 2001/0043800 A1 * | 11/2001 | Gotoh et al. | 386/111 |
| 2002/0001272 A1 | 1/2002 | Takagi et al. | |
| 2002/0031069 A1 * | 3/2002 | Nakane et al. | 369/53.15 |

FOREIGN PATENT DOCUMENTS

| | | |
|---|---|---|
| JP | 773602 A | 3/1995 |
| JP | 2001-236743 A | 8/2001 |

* cited by examiner

METHOD AND APPARATUS FOR RECORDING A DATA STREAM ON A STORAGE MEDIUM

This application claims the benefit, under 35 U.S.C. § 365 of International Application PCT/EP03/10235, filed Sep. 15, 2003, which was published in accordance with PCT Article 21(2) on Apr. 8, 2004 in English and which claims the benefit of European patent application No. 02021640.4, filed Sep. 27, 2002.

The invention relates to a method and an apparatus for recording a data stream on a storage medium, especially for recording on write once-media.

BACKGROUND

A write-once optical disk known under the acronym CD-R is broadly used in computer technology and is nowadays implemented in most of the current PCs and notebooks. However, data amounts to be stored are increasing continuously, resulting in the demand for higher storage capacity. Rewritable DVD's (DVD-RAM, DVD-RW, DVD+RW) are on the market, having a storage capacity of 4.7 GB. Furthermore, a next generation of large capacity optical discs called "Blu-ray Disc" has recently been announced, enabling the recording, rewriting and play back of up to 27 GB of data. This allows e.g. archiving computer data with high capacity or recording of two hours high-definition television video.

Defects occurring during the writing process have to be addressed in order to avoid re-writing the whole data, resulting in the case of write-once media in the use of a further disk. This is especially important for realtime recording of audio-visual (AV) data streams on write-once media or rewritable media and realtime playback of such recorded streams, since defects would result in very annoying interrupts of the picture or audio signal.

INVENTION

A problem to be solved by the invention is to enhance the resistance against defects during recording data on a storage medium and playing back the recorded data.

This problem is solved by the recording method disclosed in claim 1 and by the play back method disclosed in claim 8 An apparatus that utilizes this method is disclosed in claim 13.

According to the invention a data stream is recorded in data blocks on a storage medium, wherein the following steps are performed:
  generating an error correction block for one or more data blocks;
  writing said error correction block on said storage medium during recording;
  keeping a spare data area on the storage medium blank;
  reconstructing a defect data block using said error correction block; and
  storing said reconstructed data block in said spare data area.

Advantageous additional embodiments of the invention are disclosed in the respective dependent claims, the following description and the figures.

DRAWINGS

Figure 2:
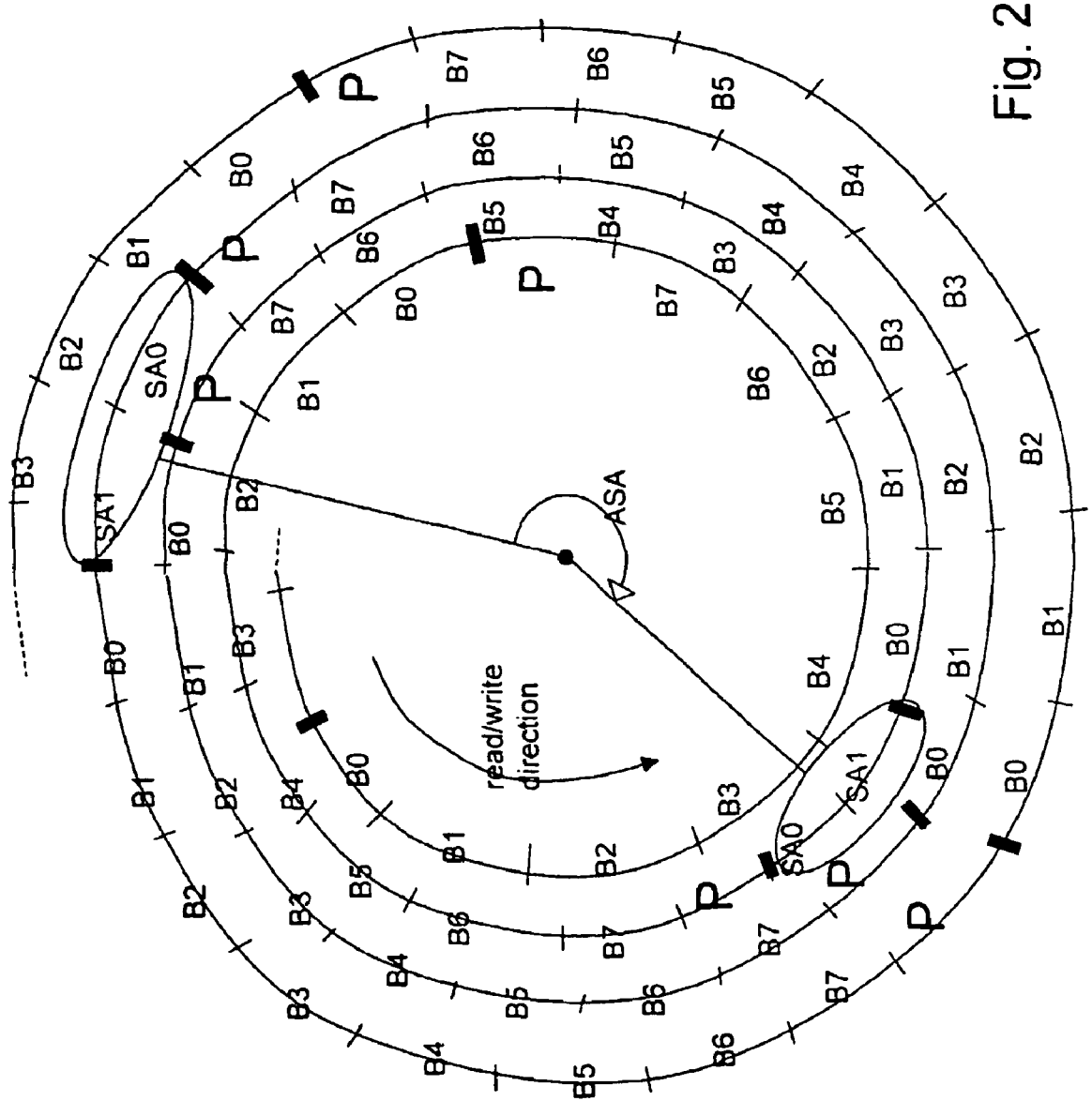
Figure 3:
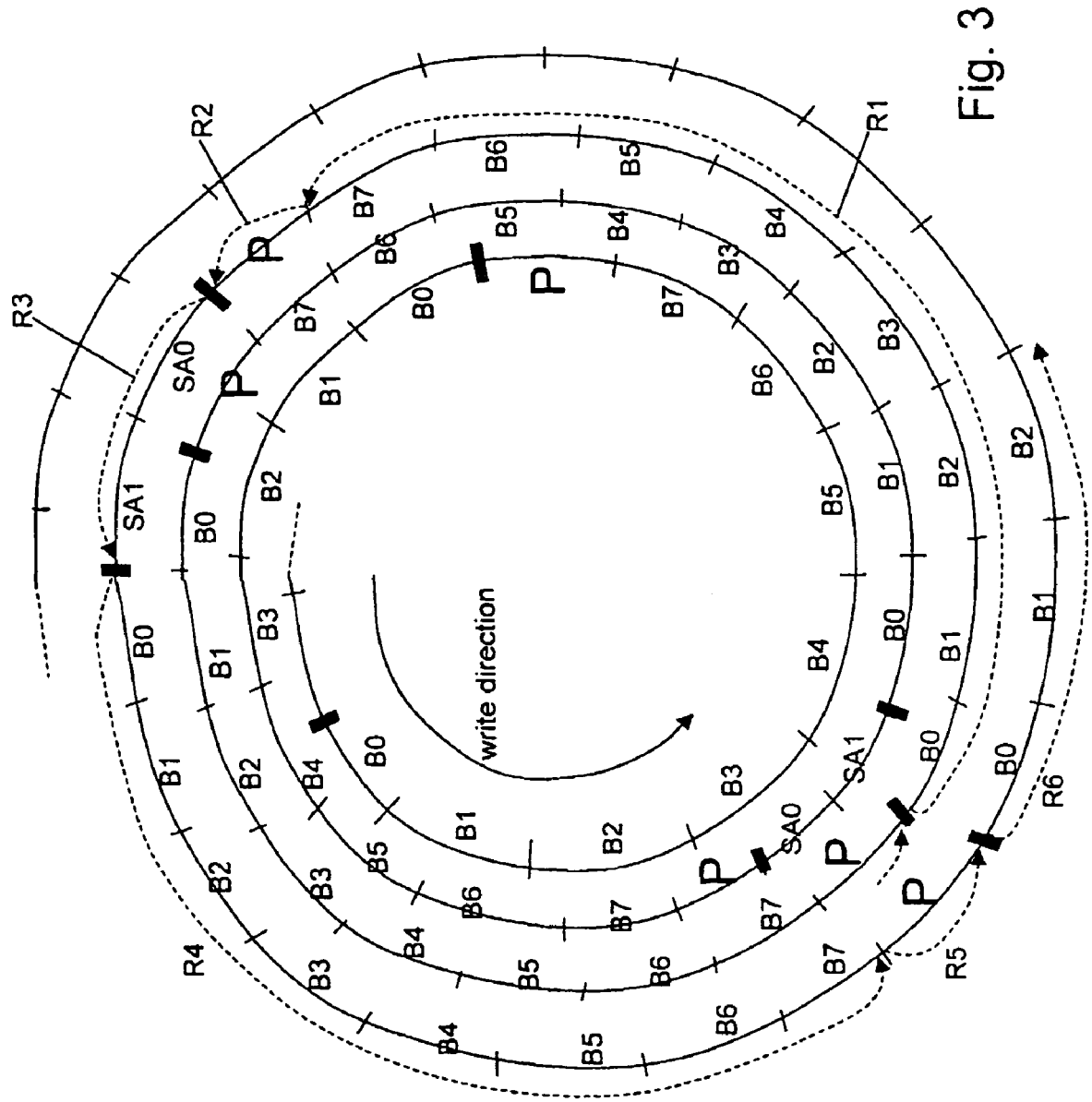
Figure 4:
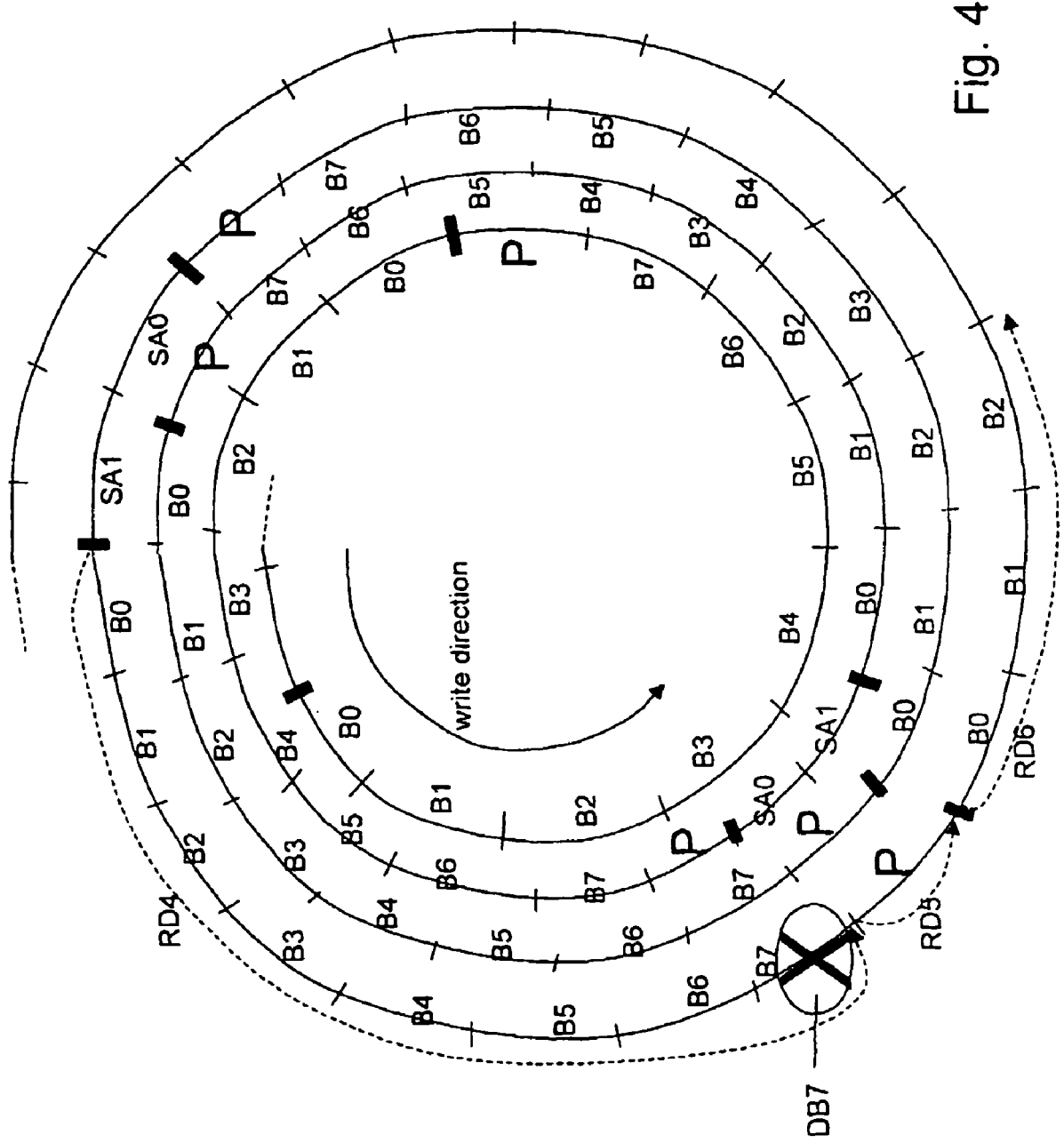
Figure 5:
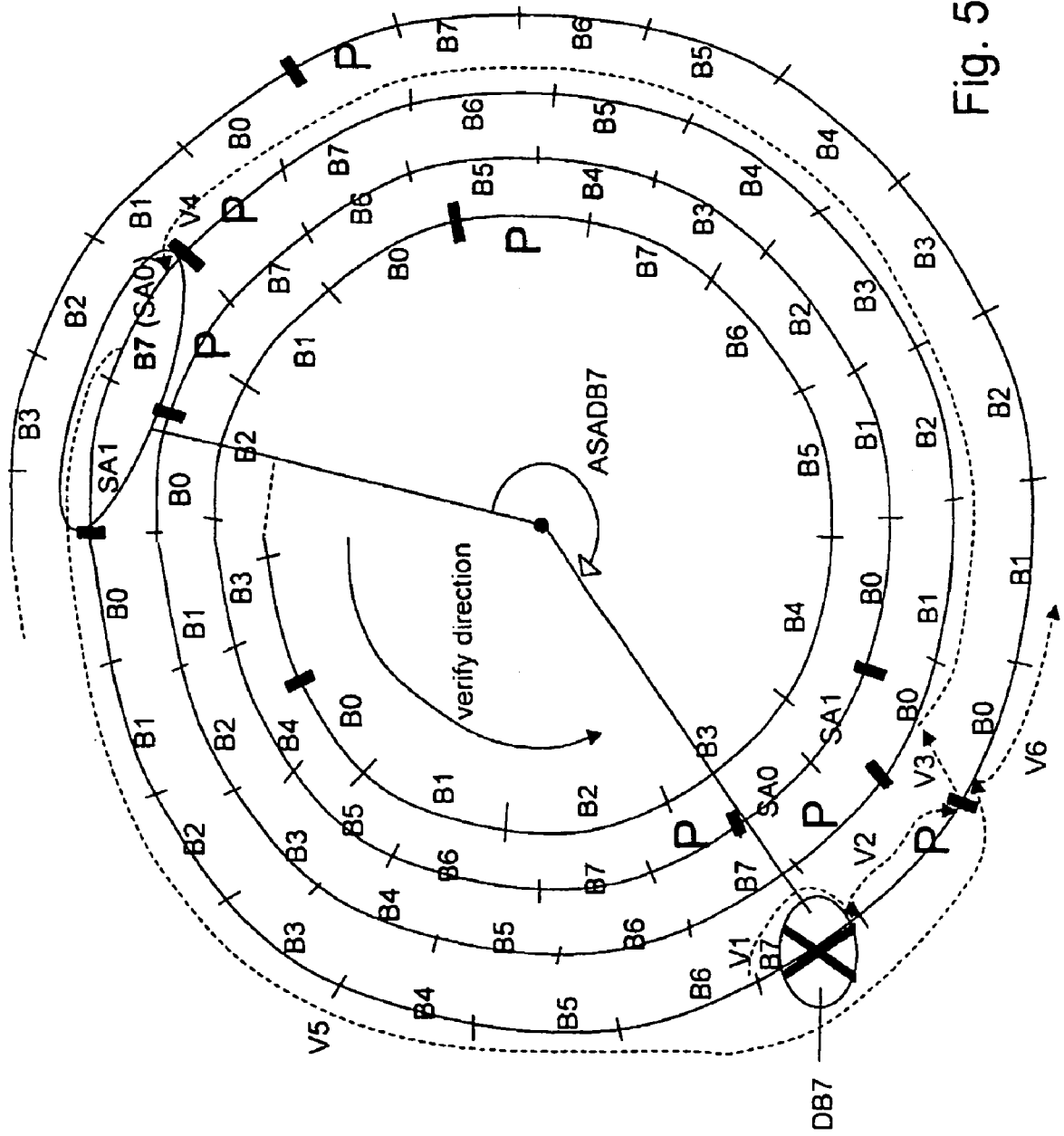
Figure 6:
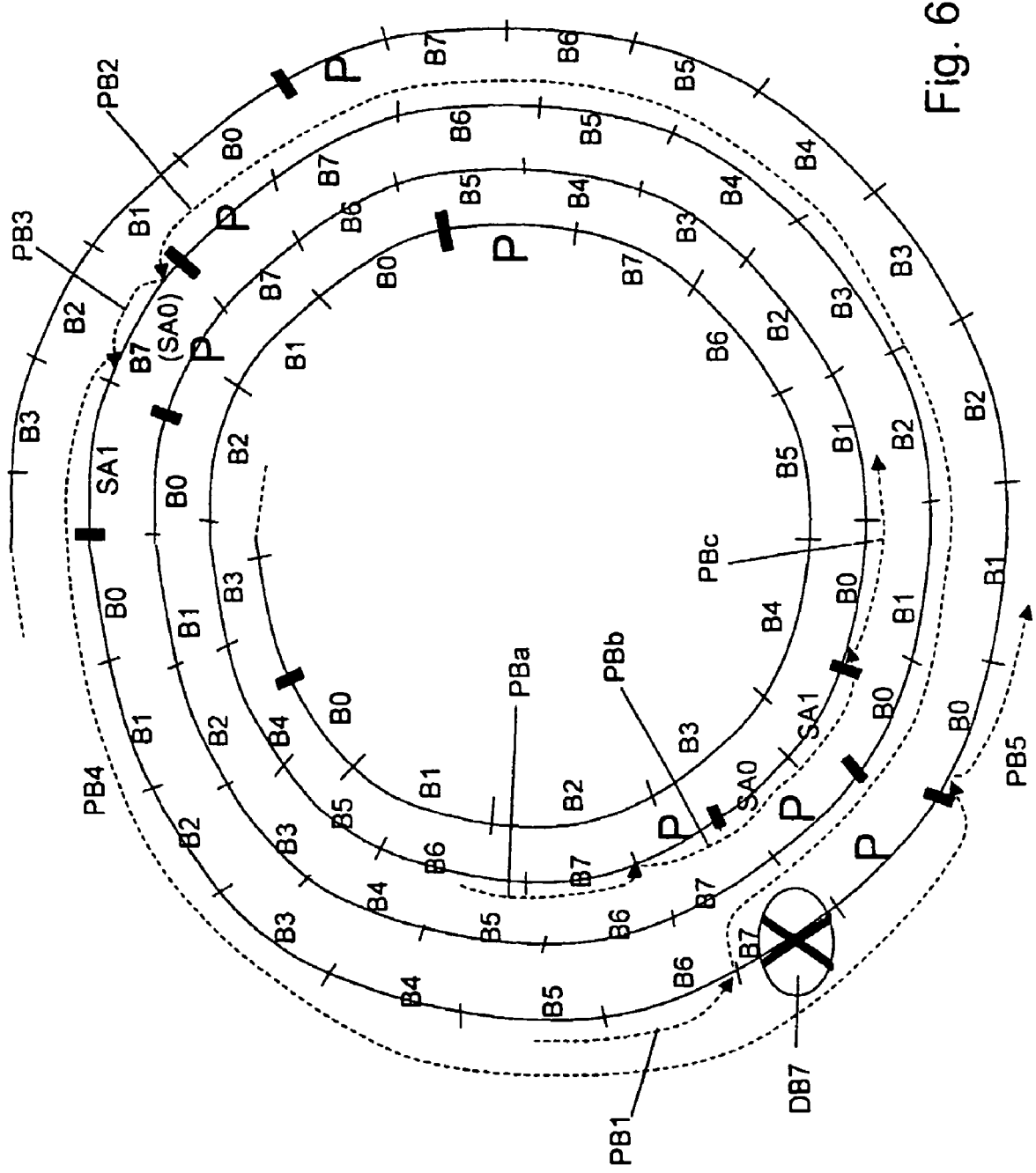
Figure 7:
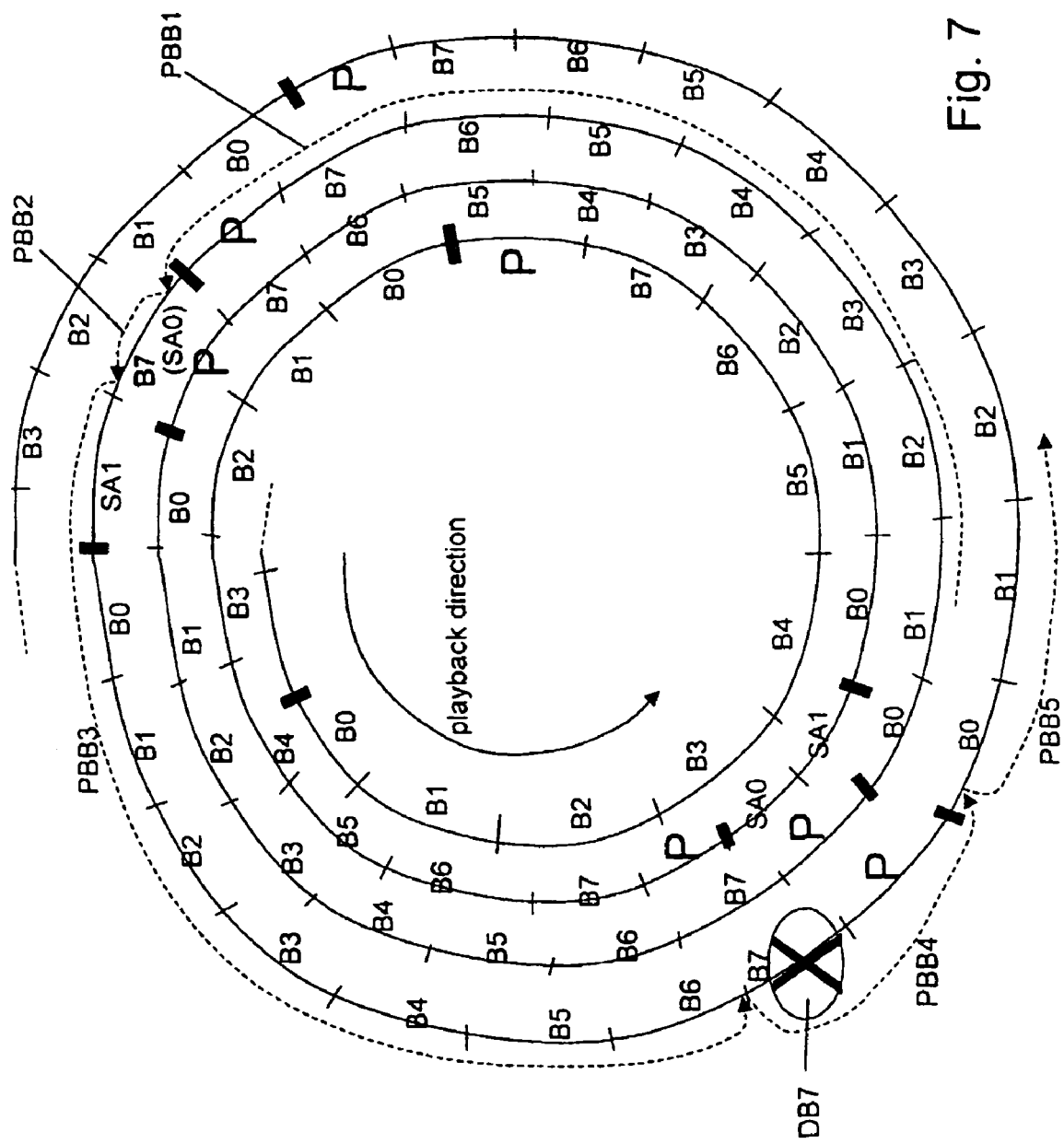
Figure 8:
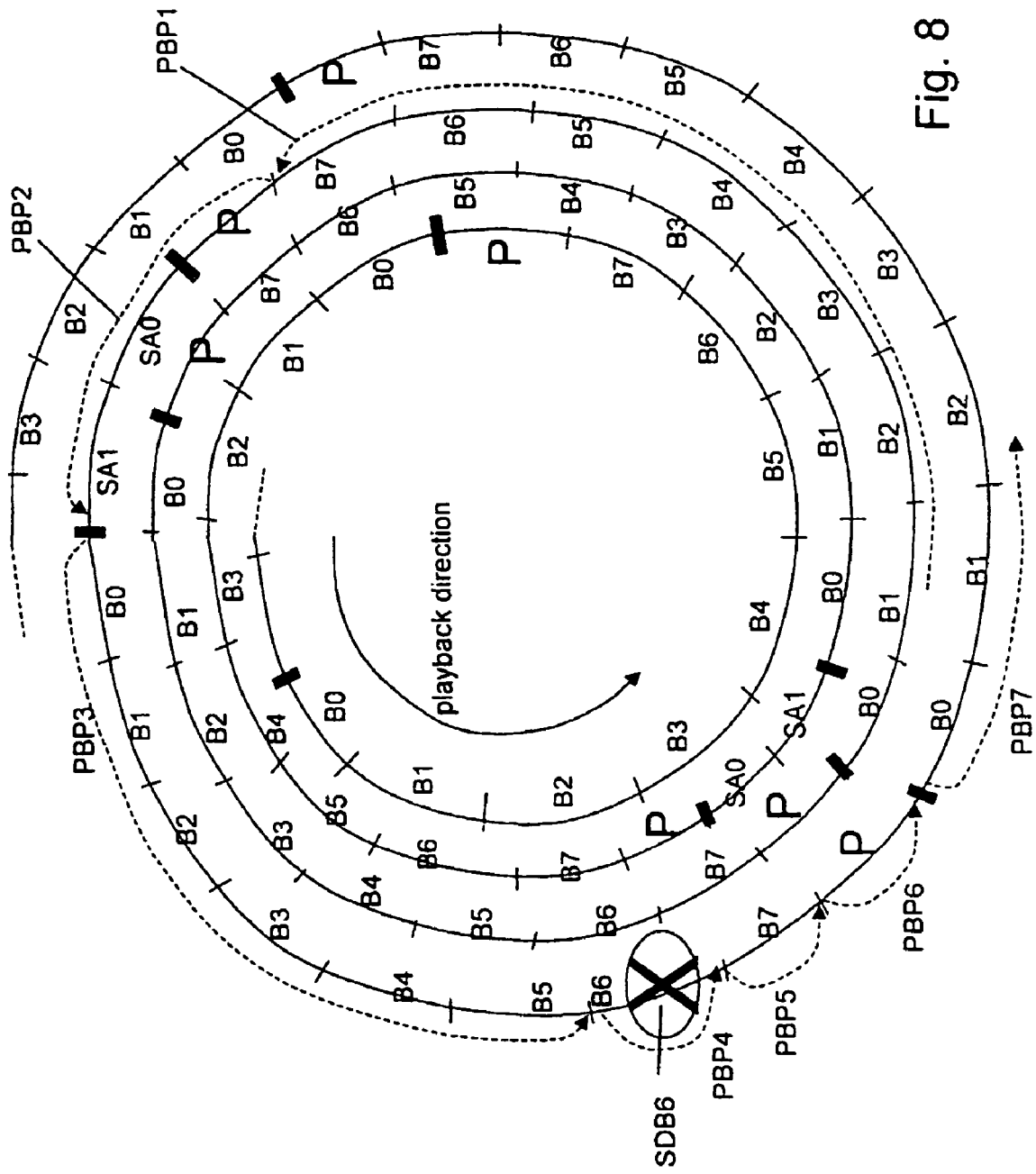
Figure 9:
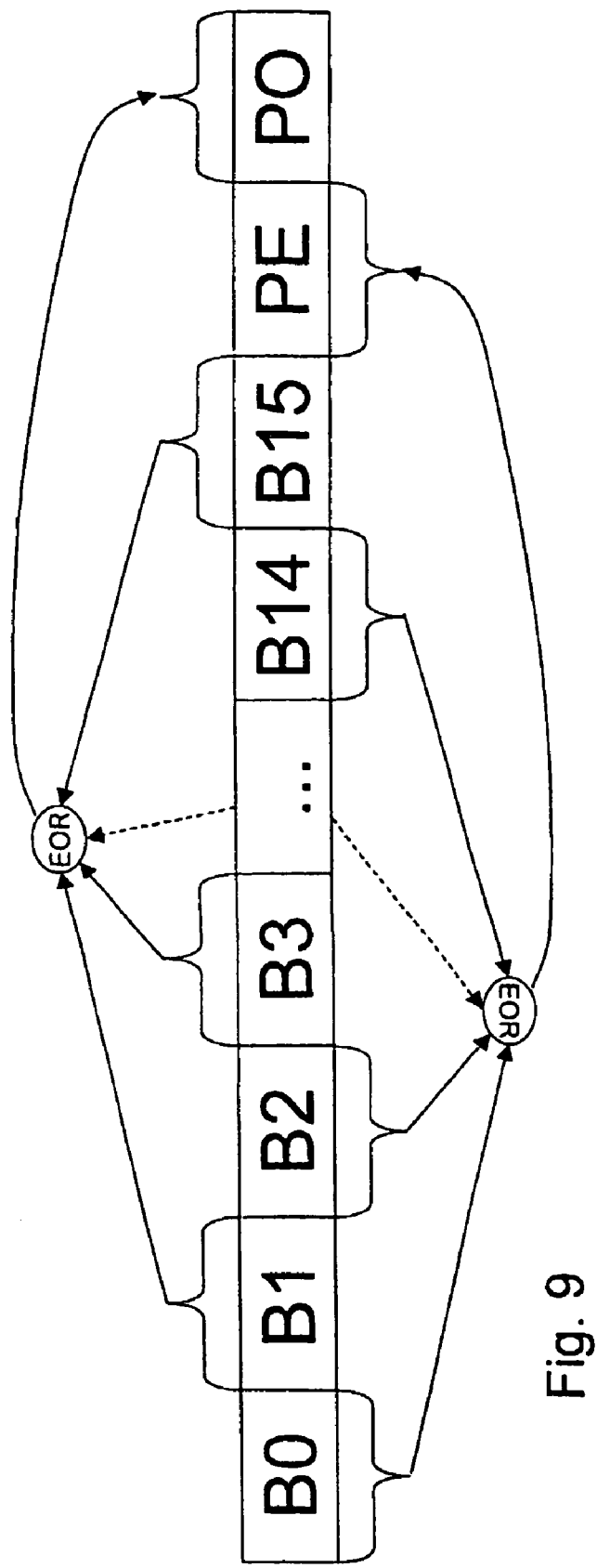
Figure 10:
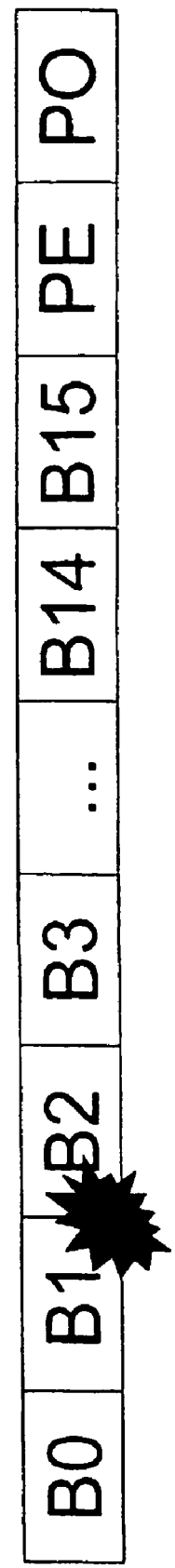
Figure 11:
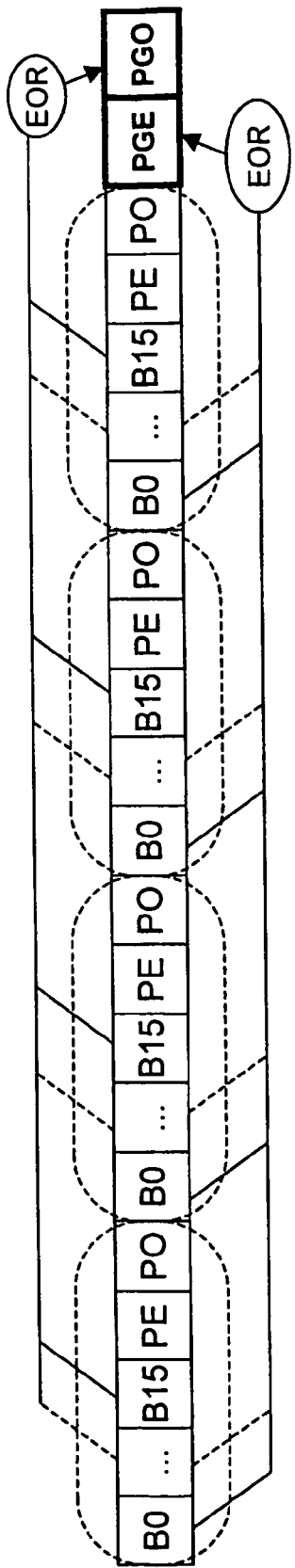
Figure 12:
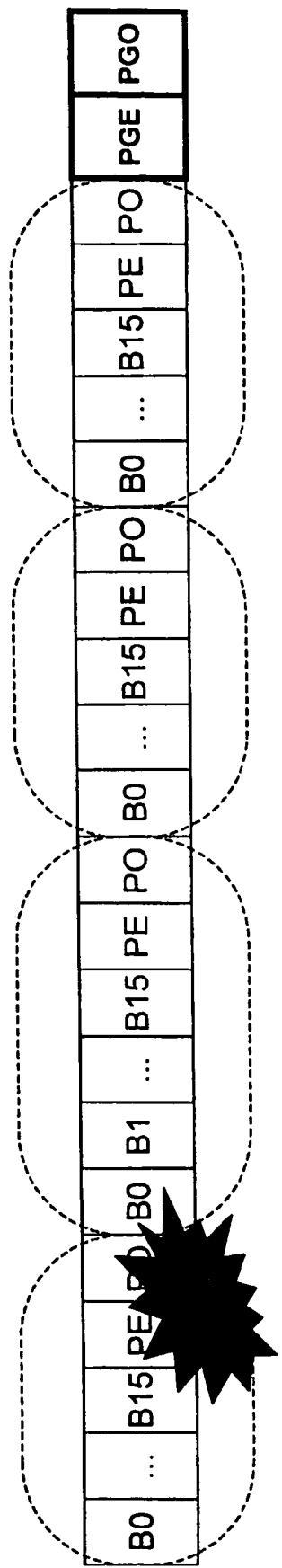

Exemplary embodiments of the invention are described with reference to the accompanying drawings, which show in:
  FIG. 1 an optical disc with a currently recorded track;
  FIG. 2 the spiral structure of the disc track containing payload blocks, parity blocks and local spare area blocks;
  FIG. 3 schematically the write process of a data stream on the disc track;
  FIG. 4 schematically the write process of a stream with an error occurring during writing;
  FIG. 5 the verifying process of the recorded data stream depicted in FIG. 4;
  FIG. 6 the default playback process of a recorded stream;
  FIG. 7 an enhanced playback process of a recorded stream for a pick-up having additional memory;
  FIG. 8 an enhanced playback process of a recorded stream for a pick-up with just in time reconstructing;
  FIG. 9 a method to use two different parity blocks to handle overlapping defects;
  FIG. 10 schematically a block sequence with two different parity blocks and two neighbouring defected data blocks;
  FIG. 11 schematically a method using additional parity blocks covering several block sequences;
  FIG. 12 an example of defected data blocks and parity blocks which can be reconstructed using the method shown in FIG. 11.

EXEMPLARY EMBODIMENTS

FIG. 1 shows an example of an optical disc with a currently recorded track T. The area A around this circle (of course, it's not a real circle; it's one rotation of the track spiral) is the area for a fast jump, i.e. all tracks covered by this area can be fast accessed by the optical pickup, i.e. the pick-up is able to jump to nearly each part of this area within one disc rotation. Furthermore, a defect block D, spare areas S and a parity block P are depicted.

The parity block P is inserted during recording on the disk and comprises data to reconstruct single defect payload blocks. This is a preventive step to provide additional information in order to reconstruct defect blocks.

More specifically, during the disk write the file system computes the parity block by e.g. XOR (logical exclusive or) combination of the corresponding bits in the covered data blocks. If later on the disk controller gives a bad block error, the file system or the pick-up itself regenerates the defect block from the other blocks and the parity block.

The parity blocks may cover one or more sequences of data blocks. Furthermore, different levels of parity blocks may be possible, i.e. some parity blocks cover only payload blocks. Other parity blocks may cover more blocks including other parity blocks. This is described in more detail below.

The use of parity blocks has several advantages:
  The method is widely scalable, wherein the manufacturer/implementer may define the number of parity blocks and the number of covered payload blocks by a parity block.
  The recording itself can be performed in realtime by using an 1× drive.
  A reconstruction in realtime during reading can be performed by using an additional buffer plus an additional logic to regenerate defect blocks by using the parity block.
  Example parameters for parity blocks may be 1 ECC block as parity block for 31 payload ECC blocks, wherein ECC (Error Correction Code) is known to be used in various forms for CD, DVD, Blu-ray disks.

During recording of the stream the recording skips some blocks. These blocks are reserved as spare areas S. After recording a post processing investigates all the defect blocks, reconstructs these bad blocks and stores the reconstructed blocks in such spare areas.

The spare areas are provided in the near area of each track in order to allow replacement blocks with short jumps or even without jumps by buffering these spare areas during playback.

Advantageously, spare areas are scattered over the whole disc by rotation angle and radius. This avoids situations, where one single spot could destroy a lot of spare areas.

Furthermore, the spare areas are advantageously scattered over the disc radius in a way, that the pick-up arrives and leaves such a spare area from each point of the disc within one single rotation. That requires,
  that the spare area is in a neighborhood track and
  not parallel to the defect block, i.e. at another angle than the defect block, wherein a good angle is approximately 180 degree.

Advantageously, the used spare area can be located before the bad block. The optical disk drive buffers the blocks of the read spare areas during playback. When the defect block is derived for which the buffered block is the replacement the optical disk drive can deliver this buffered block immediately without any jump back. This reduces jump backs, but requires more buffer to keep read replacement blocks. After delivering such a replacement block the RAM for this buffered block can be reused for new read replacement blocks.

Advantages of the use of spare areas are:
  Due to the location of spare areas near the defect blocks a replacement of defect blocks even during realtime playback is performable.
  When the spare areas are filled offline, i.e. after recording of the stream, the realtime recording can be performed by a 1× drive.
  Days after the recording, the disc may be locally damaged (e.g. by fingerprints). The new defect blocks can be reconstructed by using the parity blocks. The reconstructed blocks can be stored in these local spare areas. So, the robustness of the data is increased, even by defects generated after the recording session. I.e. this method provides a post protection and restoring of the payload by providing realtime playback.

An example definition for such spare areas is that a spare area consist of 16 ECC blocks and the distance between 2 spare areas shall be 10 and nearly a half disc rotations.

FIG. 2 depicts the spiral structure of the disc track, wherein only a part of the track is shown. The track is read and write from the inner start of the spiral to the outer end of the spiral spiral (or the other way around, e.g. for the second layer of a Blu-ray disc). The spiral contains the blocks. These blocks are of the type payload block B0, . . . ,B7, parity block P or local spare area SA0 and SA1. In this example there is a sequence of 8 payload blocks B0, . . . ,B7, followed by a parity block P. This parity block P contains the parity bits for the previous 8 payload blocks B0, . . . ,B7, meaning that it is possible to reconstruct one defect payload or parity block. The combination of the payload blocks B0, . . . ,B7 together with its parity block P are called in the following a PP sequence (PP=payload and parity). Sometimes two local spare area blocks SA0, SA1 occur immediately after a parity block P. One local area and the next following local spare area are located at different angles, the closer to 180 degree the better.

FIG. 3 describes the write process of a stream. Steps R1 to R6 describe a part of this writing process:
R1: Writing of 8 payload blocks B0, . . . , B7.
R2: Writing the parity block P of the just written 8 payload blocks B0, . . . , B7.
R3: Keep space for 2 blocks inside the local spare area: Writing of a run-out; then skip the space of two blocks, i.e. keep unrecorded space for the blocks SA0, SA1.
R4: Writing of a run-in to continue the recording. Writing of the next 8 payload blocks B0, . . . , B7.
R5: Writing of the parity block P of the just written 8 payload blocks B0, . . . , B7.
R6: Writing of the next 8 payload blocks B0, . . . , B7, i.e. this time no space is saved for a local spare area.

FIG. 4 describes the write process of a stream, wherein an error occurs during writing. Steps RD4 to RD6 describe a part of this writing process:
RD4: Writing of the next 8 payload blocks B0, . . . , B7. The writing of the last payload block DB7 fails. The pick-up is not able to detect this error during recording, i.e. the device need a verify after recording of the whole stream to detect this bad block.
RD5: Writing of the parity block P of the just written 8 payload blocks B0, . . . , B7. This parity block is required to reconstruct DB7 during a verify after the recording of the whole stream.
RD6: Writing of the next 8 payload blocks B0, . . . , B7.

FIG. 5 describes the verify process of a recorded stream. The complete recording is scanned during the verify process. In this example the defect block DB7 must be recognized, reconstructed and replaced. Steps V1 to V6 describe a part of this verify process:
V1: After reaching DB7 the pick-up recognizes that DB7 is a defect payload block. Each correct read block of this PP sequence is combined with the previously correct read block by applying a logical exclusive-OR operation, i.e. one block in the pick-up internal RAM (EOR block) is used for this concern.
V2: The pick-up reads the parity block of this PP sequence and reconstructs DB7 inside the pick-up internal RAM by using the EOR block.
V3: Jump back to a local spare area, which is located at an angle ASADB7 far away from DB7, e.g. at an angle ASADB7 between 90 to 270 degree.
V4: Skip all the blocks until arriving the local spare area. Write the reconstructed payload block B7 into the next free local spare area block SA0, including run-in and run-out.
V5: Skip all the blocks until arriving the next payload block B0, which is not yet verified.
V6: Continue verify.

FIG. 6 describes the default playback process of a recorded stream. In this example the defect block DB7 must be recognized and recovered. Steps PBa to PBc and PB1 to PB5 describe parts of this playback process:
PBa to PBc:
PBa: Read the payload blocks until the parity block of this PP sequence.
PBb: Skip the parity block.
PBc: Continue the reading of the payload blocks.
PB1 to PB5:
PB1: Read the payload blocks until the B6 block.
PB2: B7 is marked in the defect list as defect. Jump back in the track before, i.e. jump to a track position just before the replacement block SA0/B7. Skip all blocks before the replacement block SA0/B7.
PB3: Read the replacement block SA0/B7 which is the replacement block of the defect payload block DB7.
PB4: Skip all the already read blocks, i.e. skip all the blocks until the parity block just after DB7.
PB5: Continue the reading of the payload blocks B0 . . . .

FIG. 7 describes an enhanced playback process of a recorded stream. The pick-up has additional memory available to buffer replacement blocks of local spare areas. In this example the defect block DB7 must be recognized and recovered. Steps PBB1 to PBB5 describe a part of this playback process:

PBB1: Read the payload blocks and skip the parity block of this PP sequence.

PBB2: There is one replacement block B7/SA0 inside the local spare area. Read this replacement block and store it in the additional buffer.

PBB3: Skip SA1 of this local spare area. Read the payload blocks until B6.

PBB4: Recover DB7 by using the buffered payload block B7/SA0. Free the memory of the additional buffer. Skip all the blocks, until the next not yet read payload block B0.

PBB5: Continue the reading of the payload blocks B0 . . . .

FIG. 8 describes a pick-up for just in time reconstructing. This allows to reconstruct even not yet recognized defect payload blocks during playback, i.e. just in time. This feature requires a buffer to cover all payload blocks of a PP sequence for the case that the first payload block of a PP sequence is defect. In this example the defect block SDB6 must be recognized and recovered. Steps PBP1 to PBP7 describe a part of this playback process:

PBP1: Read the payload blocks B0 to B7 into the buffer and send the read blocks to the device.

PBP2: Skip the parity block of this PP sequence and the following local spare area. Note: in this example no replacement block is inside the local area.

PBP3: Read the payload blocks B0 to B5 into the buffer, i.e. overwrite the old buffer content, and send the read blocks to the device.

PBP4: B6 cannot be read: A spontaneous defect block SDB6 is detected. Skip this block SDB6.

PBP5: Continue the reading of the payload block B7 into the buffer, but do not send this block to the device yet, because B6 must be sent first.

PBP6: Read the parity block. Reconstruct the defect payload block SDB6/B6 of this PP sequence by using the buffered blocks B0 to B5, B7 and the parity block P from the buffer. Send the remaining payload blocks B6 and B7 to the device.

PBP7: Continue playback by reading the next PP sequence.

The most enhanced pick-up version, i.e. max. robustness by min. pick-up speed requirement, would be a pick-up, which buffers a whole PP sequence and several local spare areas, i.e. a combination of FIGS. 7 and 8.

FIG. 9 describes a method to use two different parity blocks PO, PE to handle overlapping defects, e.g. a defect of B1 and B2 as shown in FIG. 10. Even a reconstruction of B15 and PE is possible.

The first parity block PE is generated for the blocks B0, B2, . . . , B14, the second parity block PO for the blocks B, B3, . . . , B15.

FIG. 11 shows schematically a method using additional parity blocks covering several block sequences, which further increases the robustness in comparison to FIG. 9 and allows the reconstruction of up to four contiguous defect blocks as shown in FIG. 12. The additional parity blocks PGE and PGO cover the last four PP sequences. Each single block excluding PGE and PGO can be reconstructed twice:

1. by the PP sequence internal PE and PO and
2. by the PGE and PGO.

In this example, the additional required memory to add PE and PO is 12.5%. But, the additional required memory to add PGE and PGO is only less than 2.8%.

The invention is especially useful for recording of an AV data stream on a write once-media optical disk. But, it also increases the robustness of recorded AV streams on rewritable discs. However, it is also applicable to any other kind of data storage.

In order to recognize parity clusters and local spare area clusters these cluster types shall be indicated by the DFL (Defect List; see 6.6.5.2, Blu-ray Spec, part 1, version 1.0). A parity cluster or a contiguous parity cluster sequence (e.g. PE and PO) shall be indicated by a special Status 1 value in the DFL Entry: e.g. 1001, type parity. The Defective PSN field identifies the address of the first parity cluster of a parity cluster sequence (first parity cluster of a PP sequence). The Replacement PSN field shall indicate the number of parity clusters (e.g. 2 if PE and PO exists).

The invention claimed is:

1. A method for playing back a recorded data stream from a storage medium, wherein the data stream has been recorded in data blocks, the method comprising the steps of:
   reading payload blocks until a defect payload block is detected;
   upon detection of the defect payload block, jumping back to a replacement block and recovering the defect payload block by reading the replacement block;
   skipping the already read payload blocks; and
   continuing the reading of not yet read payload blocks;
   wherein the replacement block is read and buffered and further payload blocks are read until the defect payload block is detected.

2. The method of claim 1, wherein the read payload blocks are buffered and wherein a defect payload block is skipped and the following payload blocks and a parity block are read and buffered and wherein the defect payload block is reconstructed by using the buffered blocks and the parity block.

3. The method of claim 1, wherein the payload blocks are clusters for a Blu-ray Rewritable Disc.

4. An apparatus equipped to perform the method of claim 1, comprising:
   reading means for reading the payload blocks and the replacement block for the defect payload block, wherein the replacement block is read and buffered and further payload blocks are read until the defect payload block is detected;
   recovery means for recovering the defect payload block by using the read and buffered replacement block;
   skipping means for skipping the already read payload blocks; and
   control means for causing the reading of not yet read payload blocks to be continued.

* * * * *

UNITED STATES PATENT AND TRADEMARK OFFICE
CERTIFICATE OF CORRECTION

PATENT NO.        : 7,627,791 B2                                    Page 1 of 1
APPLICATION NO.   : 10/528596
DATED             : December 1, 2009
INVENTOR(S)       : Winter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Second Day of November, 2010

David J. Kappos
*Director of the United States Patent and Trademark Office*